(12) United States Patent  (10) Patent No.: US 8,656,380 B1
Ásgeirsson et al.  (45) Date of Patent: Feb. 18, 2014

(54) PROFILING AN EXECUTABLE

(75) Inventors: Sigurôur Eggert Ásgeirsson, Beasonsfield (CA); Christopher Howard Hamilton, Montreal (CA); Eric Dingle, Montreal (CA); Roger Delano Paul McFarlane, Saint-Laurent (CA)

(73) Assignee: Google Inc., Mountain View, CA (US)

(*) Notice: Subject to any disclaimer, the term of this patent is extended or adjusted under 35 U.S.C. 154(b) by 92 days.

(21) Appl. No.: 13/468,906

(22) Filed: May 10, 2012

(51) Int. Cl.
  *G06F 9/45* (2006.01)
(52) U.S. Cl.
  USPC .......................................................... 717/158
(58) Field of Classification Search
  USPC .......................................................... 717/158
  See application file for complete search history.

(56) References Cited

U.S. PATENT DOCUMENTS

| | | | |
|---|---|---|---|
| 5,960,198 A * | 9/1999 | Roediger et al. | 717/130 |
| 6,006,033 A | 12/1999 | Heisch | |
| 7,200,547 B2 | 4/2007 | Lafage et al. | |
| 7,665,070 B2 | 2/2010 | Kailas | |
| 7,784,042 B1 | 8/2010 | Lobo et al. | |
| 8,307,345 B2 * | 11/2012 | Sunkara et al. | 717/130 |
| 8,473,925 B2 * | 6/2013 | Gagliardi et al. | 717/130 |
| 2008/0005730 A1 * | 1/2008 | Inamdar | 717/158 |
| 2010/0115495 A1 * | 5/2010 | Sunkara et al. | 717/130 |

OTHER PUBLICATIONS

Compiler, Assembler, Linker and Loader: A Brief Story, printed Mar. 14, 2012, retrieved from internet URL:www.tenouk.com/ModuleW. html, 11 pages.

CSE401-Additonal Topics presentation slides, 2 pages.
ELF, OSDev Wiki, Jan. 24, 2012, 6 pages.
Executable and Linkable Format (ELF), Tool Interface Stand (TIS) Portable Formats Specification Version 1.1, Jan. 20, 1992, 60 pages.
Linear-Executable (LE) File Header Layout, Faydoc Tripod, Mar. 15, 2012, 7 pages.
Pietrek, Matt, "An In-Depth Look into the Win32 Portable Executable File Format, Part 2", Mar. 2002 issue of MSDN Magazine, printed Mar. 15, 2012, 7 pages.
Profiling (computer programming), Wikipedia, Dec. 13, 2011, 6 pages.
SyzygyDesign—Design Overview for the Syzygy toolchain, Sawbuck, Dec. 7, 2011, 6 pages.
IBM Developer Kit and Runtime Environment, Java 2 Technology Edition. Dec. 17, 2013.
Intel® VTune™ Amplifier XE 2013 Product Brief. Dec. 17, 2013.
"Understanding Instrumentation Data Values in Profiling Tools." Microsoft Developer Network.

* cited by examiner

*Primary Examiner* — Philip Wang
(74) *Attorney, Agent, or Firm* — Foley and Lardner LLP; John D. Lanza

(57) ABSTRACT

Systems and methods for profiling an executable include generating differently instrumented versions of a portion of the program code for the executable. References to the portion of the program code may be replaced with references to a control function that conditionally executes the differently instrumented versions. Different profiling modes may be selected at runtime to control which version is executed. Profiling data may also be generated during execution of the program.

20 Claims, 4 Drawing Sheets

PROFILING AN EXECUTABLE

BACKGROUND

The present disclosure relates generally to profiling an executable file. The present disclosure more specifically relates to controlling the profiling mode for the executable at runtime.

Various levels of abstraction often separate source code written by a programmer and the actual instructions executed by a computing device. For example, a programmer may write source code for a computer program in a high-level programming language, such as C++ or C. The source code may then be transformed by a compiler into assembler code. Likewise, an assembler may then convert the assembler code into an object file having assembly code with offsets. A linker may then merge one or more object files or libraries into an executable file. During linking, references to external symbols may be resolved and finalized addresses to functions and variables may be generated.

SUMMARY

Implementations of the systems and methods for profiling an executable are described herein. One implementation is a computerized method for profiling an executable program. The method includes determining, by a processing circuit, one or more references to a portion of code in the executable program. The method also includes generating, by the processing circuit, a plurality of versions of the portion of code, each generated version having a different number of instrumentation instructions inserted into the portion of the code. The method further includes inserting, by the processing circuit, the generated versions of the portion of code into the executable program. The method additionally includes generating, by the processing circuit, a control function that conditionally executes the generated versions of the portion of the code. The method also includes inserting, by the processing circuit, the control function into the executable program. The method additionally includes replacing, by the processing circuit, the one or more references to the portion of code with one or more references to the control function.

Another implementation is a system for profiling an executable program. The system includes a processing circuit operable to determine one or more references to a portion of code in the executable program. The processing circuit is also operable to generate a plurality of versions of the portion of code, each generated version having a different number of instrumentation instructions inserted into the portion of the code. The processing circuit is further operable to insert the generated versions of the portion of code into the executable program. The processing circuit is yet further operable to generate a control function that conditionally executes the generated versions of the portion of the code. The processing circuit is also operable to insert the control function into the executable program. The processing circuit is additionally operable to replace the one or more references to the portion of code with one or more references to the control function.

A further implementation is a computer-readable, storage medium having instructions therein, the instructions being executable by a processor to cause the processor to perform operations. The operations include determining one or more references to a portion of code in the executable program. The operations also include generating a plurality of versions of the portion of code, each generated version having a different number of instrumentation instructions inserted into the portion of the code. The operations further include inserting the generated versions of the portion of code into the executable program. The operations yet further include generating a control function that conditionally executes the generated versions of the portion of the code. The operations additionally include inserting the control function into the executable program. The operations also include replacing the one or more references to the portion of code with one or more references to the control function.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

DETAILED DESCRIPTION

Figure 1:
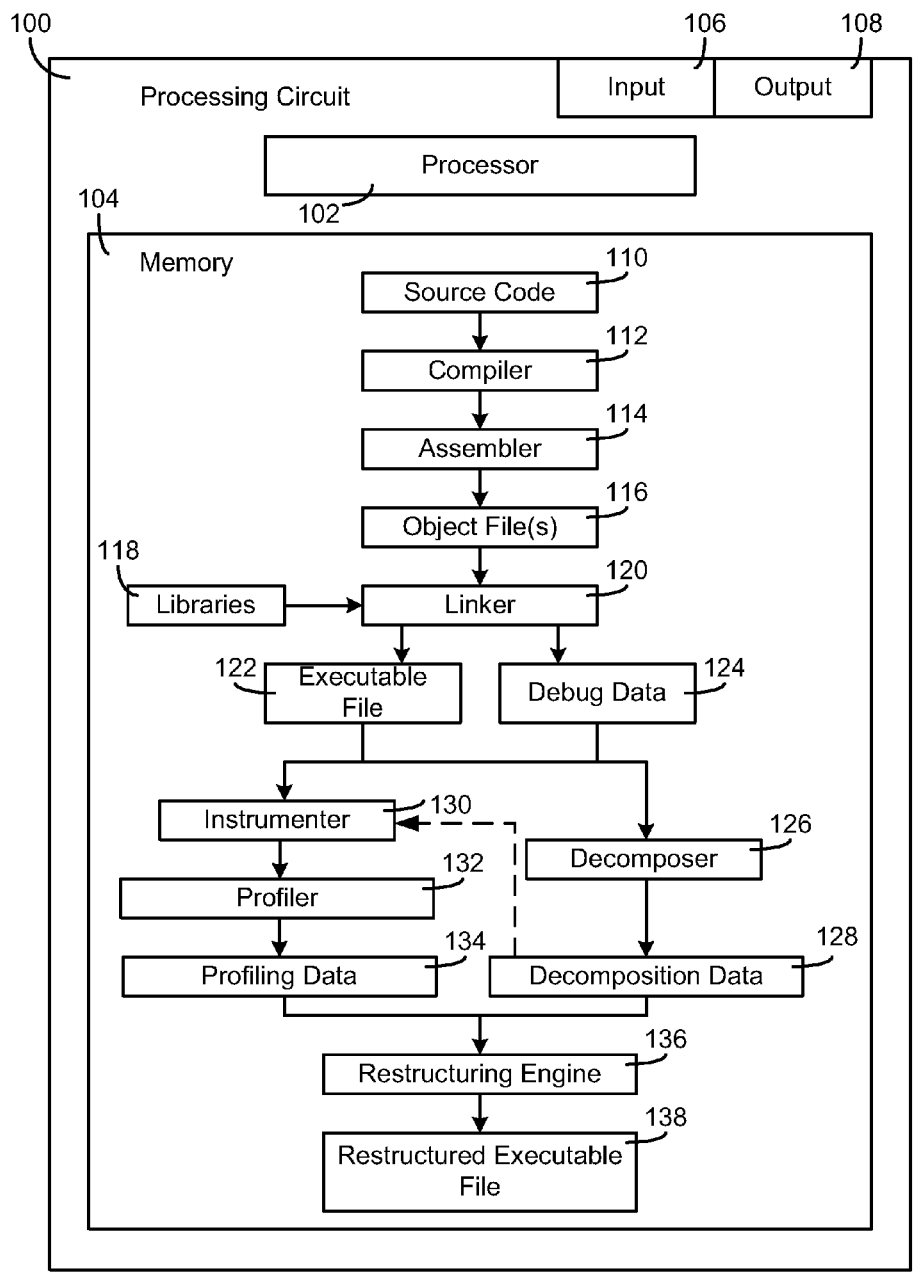
FIG. 1 is a block diagram of a computer system in accordance with a described implementation.

According to some aspects of the present disclosure, a running program may be analyzed to generate profiling data indicative of the flow of execution of the program. For example, profiling data may indicate when a particular portion of the program code (a code block, function, machine instruction, etc.) is executed at runtime. In various implementations, profiling data may be used to optimize a post-linked, executable file, such as a stand-alone executable file or shared object file (e.g., a dynamic link library (DLL)). In many cases, an executable file is generated without regard to the actual use of its functions, variables, and other program data. For example, assume that source code for a program has five code blocks appearing in the following order: B1-B5. A linker may follow this order when combining the object code into the executable file. However, the program many not execute linearly. For example, assume that code block B1 includes a jump to block B4 (e.g., a function calls another function). In other words, the order of execution of the code blocks when the executable file is run may not follow the addressing order generated by the linker.

In some instances, a page fault may occur when an executable program is run, due to how the program was linked. In general, a page fault occurs when a processor attempts to access a portion of an executable program that has not been loaded from a slower memory into a faster memory for use by the processor. For example, a page fault may occur if the processor attempts to execute a function that has not yet been loaded into the processor's cache or into RAM. In such a case, execution of the program may be slowed while the function is loaded from a slower memory into the faster memory. For example, execution of the program may be delayed while the function is loaded from the hard disk into RAM and/or the processor's cache. During cold starts (e.g., when the program is first started), page faults may be more prevalent due to the program being loaded according to the addressing order generated by the linker. For example, a code block may jump to another code block that has not yet been loaded into the faster memory, thereby causing a page fault.

Profiling data may be analyzed and used to optimize an executable file. In some implementations, the executable may be decomposed into its constituent code blocks and data blocks (e.g., functions and variables stored within memory during execution of the program). In some cases, the decomposed executable may be represented as a block graph. Each block in the graph may represent a portion of the object code and may be connected to other blocks that call the block or are called by the block. A restructuring engine may analyze the results of the profiling process to determine an ordering that more closely reflects the actual order of execution of the program. The decomposed binary may then be recomposed into a rewritten executable that follows the ordering determined by the restructuring engine.

Profiling data for a program may be generated in a number of different ways. In some implementations, an executable file may be instrumented. In general, the act of instrumenting refers to inserting instrumentation instructions into an executable program to produce an instrumented executable file. In various implementations, an instrumentation instruction may be associated with a particular portion of the program. When the instrumented program is run, such an instruction may be executed before, during, or after its associated portion of the program is executed. In various implementations, a calltrace profiler may be used to record whenever an instrumentation instruction is executed. For example, the calltrace profiler may write profiling data to a log file during execution of the instrumented program. Instrumentation instructions may be inserted at various levels (e.g., at the function block level, within function blocks, etc.), to control the level of detail provided by the profiling process, according to various implementations. However, increasing the level of detail about the execution of the program via instrumentation may also decrease the performance of the program, since doing so adds additional instructions to be executed when the program is run and may increase the volume of profiling data.

In some implementations, a statistical approach may be taken to profile an executable file. Rather than inserting instrumentation instructions into the program and recording when the instructions are executed, the program counter for the program may be sampled periodically to determine which portions of the program are being executed during the sampling periods. Statistical analysis may then be performed on the sampled results to determine how often the different portions of the program code are executed. In general, statistical approaches have minimal effect on the performance of the program. However, the profiling data generated by statistical approaches is approximate and may be of low quality. In addition, statistical approaches only allow detection of CPU intensive portions of the code and not those portions that take higher amounts of wall-clock time to execute due to blocking.

According to various implementations, a multimodal approach may be taken to profile an executable file. Different versions of a portion of the program code may be generated that contain different degrees of instrumentations, allowing control over the level of detail collected for the profiling data. In some implementations, references to a portion of the program may be diverted to a controlling function that forwards invocations of the portion of the program to one of a plurality of differently instrumented versions of the portion. A parameter may be used to control which version of the portion is called during runtime, allowing a user to vary the amount of profiling data generated regarding the portion of the program. For example, a user may specify that statistical profiling is to be used for the majority of the program and instrumented profiling is to be used for a particular function within the program. Thus, the amount of detail regarding the execution of the program may vary for different portions of the program code (e.g., allowing the user to obtain detailed information about the execution of a portion of the code without significantly impacting the performance of the entire program). Parameters may be set at any level of the code to control the level of instrumentation detail (e.g., at the global level, at the binary level, at the thread level, at the function level, etc.), in various implementations. Additionally, parameters that control the amount of profiling detail may be set manually by a user or automatically (i.e., not in response to a command from a user), during runtime of the profiling process.

Referring to FIG. 1, a detailed block diagram of processing circuit 100 is shown, according to some implementations. Processing circuit 100 includes processor 102 and memory 104. Processor 102 may be or include one or more microprocessors, an application specific integrated circuit (ASIC), a circuit containing one or more processing components, a group of distributed processing components, circuitry for supporting a microprocessor, or other hardware configured for processing data. Processor 102 is also configured to execute computer code stored in memory 104 to complete and facilitate the activities described herein. Memory 104 may include, but is not limited to, electronic, optical, magnetic, or any other storage or transmission device capable of providing processor 102 with program instructions and/or storing a digital photograph. Memory 104 may include a floppy disk, CD-ROM, DVD, magnetic disk, memory chip, ROM, RAM, EEPROM, EPROM, flash memory, optical media, or any other suitable tangible, computer-readable storage medium from which processor 102 can read instructions. In some implementations, memory 104 may be, or may include, a removable memory device (e.g., a flash drive, a memory stick, a secure digital (SD) card, etc.). The instructions may include code originating from any suitable computer programming language such as, but not limited to, C, C++, C#, Java, JavaScript, Perl, HTML, XML, Python and Visual Basic. For example, memory 104 is shown to include a compiler 112, an assembler 114, a linker 120, a decomposer 126, an instrumenter 130, a profiler 132, and a restructuring engine 136, which may be implemented using computer code (e.g., executable code, object code, source code, script code, machine code, etc.) configured for execution by processor 102. When executed by processor 102, processing circuit 100 is configured to complete the activities described herein.

Processing circuit 100 also includes hardware circuitry for supporting the execution of compiler 112, assembler 114, linker 120, decomposer 126, instrumenter 130, profiler 132, and restructuring engine 136. For example, processing circuit 100 may include one or more hardware interfaces (e.g., output 108) configured to communicate data to another processing circuit and/or computing device. Similarly, processing circuit 100 may include one or more hardware interfaces (e.g., input 106) configured to receive data from another processing circuit and/or computing device. For example, processing circuit 100 may include one or more interfaces configured to receive and/or transmit data via a wired connection (e.g., an Ethernet port, a serial port, a universal serial bus (USB) port, or the like). Processing circuit 100 may also include one or more interfaces configured to receive and/or transmit data via a wireless connection (e.g., a WiFi transceiver, an antenna, a cellular transceiver, etc.). Although memory 104 is shown to include various executable programs and data, some or all of the illustrated programs and data may reside in another memory in communication with processing circuit via input 106 and/or output 108, according to other implementations. For example, memory 104 is shown to include linker 120 which generates an executable file 122 and debug data 124. In other implementations, however, linker 120 may be stored in the memory of another computing device and executable file 122 and debug data 124 may be received by processing circuit 100 via input 106.

In various implementations, memory 104 may include one or more computer programs configured to translate source code 110 into executable file 122. Source code 110 may be stored as one or more files containing program code written by a programmer in a selected programming language (e.g., Lisp, Scheme, C++, C, or any other compiled programming language). For example, processing circuit 100 may receive source code 110 via input 106 from a user interface device (e.g., a keyboard, touch screen display, a pointing device, etc.) operated by a programmer. In another example, source code 110 may be received via input 106 from a remote computing device. For example, source code 110 may be received from a server for a collaborative programming environment (e.g., a document management system, a webpage, a database, a file system, etc.).

Compiler 112 is configured to translate source code 110 into assembler source code. In general, a compiler takes source code written in a high-level programming language as input. Source code written in a high-level programming language may be independent of the target system (e.g., the configuration of the computing system that will execute the finalized program). To translate the system-independent code into machine instructions for the target system, a system-specific assembler, such as assembler 114 may be used. Thus, compiler 112 may translate source code 110 from a high-level programming language into a low-level programming language that may be used as input to assembler 114, in various implementations. In some implementations, compiler 112 may preprocess source code 110 to detect syntax errors, identify include files, process compilation settings, and perform similar preprocessing functions. In some implementations, compiler 112 and assembler 114 may be part of the same application that combines the compiling and assembly steps.

Assembler 114 translates assembler source code generated by compiler 112 into one or more object files 116. Object files 116 may contain machine instructions for a particular type and configuration of computing system. However, object files 116 may not be directly executable by such a system, since the machine instructions for an executable file may be spread across multiple object files 116. In some cases, object files 116 may also include metadata that may include comments, program symbols, relocation data, and other information. Example formats that may be used for object files 116 include the a.out format, common object file format (COFF), extended COFF (ECOFF), portable executable (PE) format, and the executable and linking format (ELF).

Linker 120 is configured to combine object files 116 and one or more libraries 118, if referenced, into executable file 122. Libraries 118 may include standard functions that are commonly used, allowing programmers to simply reference the functions instead of re-implementing them each time a new program is written. During linking, linker 120 may determine an addressing order in which the instructions of object files 116 and libraries 118 are to appear in executable file 122. In various implementations, linker 120 may also generate debug data 124. Debug data 124 may include data, for example, indicative of which lines of a particular source file a machine instruction originated, undecorated and decorated symbol names, locations of individual instructions and basic blocks in a function block, program arcs (i.e., references between code and/or data blocks), locations of lookup and case tables, locations of padding (e.g., extraneous data inserted between instructions or blocks), and other data. Example formats for debug data 124 include the program database (PDB) format and the DWARF format. After linking by linker 120, executable file 122 may be ready for execution by a computing system.

According to various implementations, memory 104 may include decomposer 126. Decomposer 126 may be configured to analyze executable file 122 and debug data 124, to generate decomposition data 128. Decomposition data 128 includes any type of data indicative of the addressing layout of executable file 122. In various implementations, decomposition data 128 may include a block graph representing the blocks of executable file 122 (e.g., code blocks and/or data blocks), potential points at which code execution can start, and program arcs (e.g., references between code blocks and/or data blocks). In some implementations, a code block may correspond to a portion of executable file 122 that contains instructions and a data block may correspond to a portion of executable file 122 that contains defined variables and/or constants. For example, nodes in the block graph may correspond to the code and data blocks of executable file 122 and edges in the block graph may correspond to identified program arcs. In some cases, a defined function may span multiple code blocks. For example, assume that the function includes several portions of code that may be executed conditionally (e.g., via an if statement, a case statement, etc.). Therefore, the instructions executed under each condition may correspond to different code blocks, in one implementation.

In some implementations, decomposer 126 may analyze header information in executable 122 to identify segments of the executable code. Decomposer 126 may use the segment information to analyze debug data 124, in order to identify code and/or data blocks within the identified segments. In general, a data block refers to a portion of an executable program in which constants, variables, etc. are stored. Similarly, a code block refers to a portion of an executable program in which operation instructions are stored. According to various implementations, decomposer 126 may analyze relocation data (e.g., a relocation table, etc.) within executable file 122 to identify arcs in the program. Relocation data may be, for example, a listing of locations in the executable file that encode references to other locations in the executable. In various implementations, decomposer 126 may supplement arc data from executable file 122 with addressing mode and/or offset information by analyzing debug data 124. For example, a relocation table may include information necessary to shift memory addresses of the executable program, when the program is loaded into a primary memory (e.g., by a loader program of an operating system). However, offset information may also be needed by restructuring engine 136 to restructure portions of executable file 122 (e.g., to account for computed jumps). Decomposer 126 may also determine starting execution locations within identified code blocks by analyzing debug data 124 and/or executable file 122. For example, decomposer 126 may analyze locations in executable file 122 indicated by labels and symbols in debug data 124 to identify the location of instructions in executable file 122. Decomposer 126 may then recursively analyze an instruction in executable file 122, detect a relocation from the analyzed instruction to another address, analyze the code at the indicated address, and repeat until no new instructions are identified. Decomposer 126 may further analyze any identified code and/or data blocks in executable file 122 to detect padding bytes (i.e., extraneous data separating blocks that are not executed when the program is run).

Decomposer 126 may use any information it obtains about the structure of executable file 122 to generate decomposition data 128. In some implementations, decomposition data 128 may be a graph of portions of code within executable file 122. For example, nodes in the graph may correspond to code blocks and/or data blocks identified by decomposer 126 by analyzing debug data 126 and executable file 122. Similarly, edges in the graph may correspond to arcs identified by decomposer 126 (e.g., control flow arcs and/or data pointer arc). For example, some edges in the graph may correspond to function pointers (e.g., a virtual table that references virtual functions for a class) and/or jump tables for case statements. In other words, edges of the graph may correspond to any portion of the executable code that references another portion located in a non-contiguous memory location. Such a graph may be used by restructuring engine 136 to restructure executable file 122 into restructured executable file 138, according to some implementations. For example, restructuring engine 136 may traverse the various execution paths (e.g., sets of one or more edges) of the graph in decomposition data 128 to identify the execution order for the program.

Memory 104 may include instrumenter 130 configured to instrument executable file 122, according to various implementations. For example, instrumenter 130 may insert one or more instrumentation instructions into the program of executable file 122 to generate an instrumented version of executable file 122. An instrumentation instruction inserted by instrumenter 130 into the program code of executable file 122 may cause profiler 132 to record information regarding when the instrumentation instruction is executed during runtime. In some implementations, profiler 132 may be, or may include, a DLL having one or more calltrace functions. For example, an instrumentation instruction inserted by instrumenter 130 into the code of executable file 122 may correspond to a function exported from a DLL associated with profiler 132 (e.g., instrumenter 130 may replace a reference to a particular function in the code of executable file 122 with a reference to a function exported by profiler 132). In some implementations, instrumenter 130 may add a new import table entry for a DLL of profiler 132 into the code of executable file 122.

In some implementations, instrumenter 130 may analyze executable file 122 and/or debug data 124 to determine points in the code of executable file 122 at which to insert instrumentation instructions. For example, instrumenter 130 may identify function references and/or program arcs by analyzing relocation entries in executable file 122 (e.g., entries within a relocation table or similar structure). In further implementations, instrumenter 130 may perform the same or similar analysis as that of decomposer 126 to identify portions of the code in executable file 122. For example, instrumenter 130 may identify code blocks, data blocks, padding bytes, arcs, and/or start execution locations to determine locations in the program to insert instrumentation instructions. In other implementations, instrumenter 130 may analyze decomposition data 128 to determine one or more locations in which to insert instrumentation instructions.

Instrumenter 130 may generate a plurality of versions of the same portion of program code from executable file 122, each version having different degrees of instrumentation. For example, one version may be minimally instrumented (e.g., having few or no instrumentation instructions contained therein), another version may include an intermediary amount of instrumentation (e.g., instrumentation instructions at the start and/or end of the portion of code), and a further version may include an even greater amount of instrumentation (e.g., instrumentation instructions at the start, end, and middle of the portion of code). According to various implementations, an executable program may be instrumented at the block level, function level, instruction level, or any other degree of granularity. In some implementations, instrumenter 130 may append the generated versions of the portion of code to the instrumented executable file or may restructure the executable code to include the generated versions within an existing code segment.

Instrumenter 130 may also generate a control function corresponding to a portion of program code to be instrumented. In various implementations, instrumenter 130 may replace references to the original portion of program code with references to the control function when generating the instrumented executable. For example, instrumenter 130 may replace all arcs in executable file 122 with arcs to a generated control function, when generating the instrumented executable. According to various implementations, the control function may conditionally invoke the versions of the portion of code generated by instrumenter 130. For example, the control function may reference a first version of the program code that contains minimal or no instrumentation instructions, a second version of the program code that contains an intermediate amount of instrumentation, and a third version of the program code that contains an even greater amount of instrumentation.

In other implementations, instrumenter 130 may patch the preamble of a portion of program code that is being instrumented. For example, the start of a function being instrumented may be overwritten by instrumenter 130 to include an instruction that references the control function, instead of simply updating the references to the function. However, functions that are shorter than a certain number of bytes (e.g., as dictated by the computer architecture), functions that contain a jump, and functions that branch to the preamble of their body may not be profiled fully using this technique, in some cases. In various examples, five bytes of the preamble may be overwritten in x86 implementations, while six byes may be overwritten in IA64 implementations. To relocate the instructions found in the preamble to a new location, any instructions in the first five bytes (e.g., in x86 implementations) may be relocated to a new location where the instructions may be invoked and the execution can be directed to the tail end of the function. In some cases, whole instructions may be relocated, leading to more than five bytes being relocated. For example, the longest x86 instruction is fifteen bytes. If such an instruction occupies the last byte of the five bytes, a total of nineteen bytes will need to be relocated (e.g., the fifteen for the instruction and the other four bytes in the preamble).

In some implementations, the version referenced by control function may be selected based in part on a global variable generated by instrumenter 130 and inserted into the instrumented program. For example, the control function may execute a particular version of the program code based in part on the value of a global variable inserted by instrumenter 130 into the instrumented executable. In other implementations, the control function may execute a particular version based in part on an inserted variable that is specific to the portion of code associated with the control function. Thus, a user may control the amount of profiling data 134 collected at runtime by specifying the value of a global variable or function-specific variable (e.g., by entering a command line parameter, by selecting an icon associated with a value, etc.).

Profiler 132 is configured to analyze the execution of the instrumented program at runtime and to generate profiling data 134, based in part on the analysis. In some implementations, profiler 132 may include a calltrace profiler that detects the execution of instrumentation instructions inserted into the program of executable file 122. For example, an instrumentation instruction may be inserted at the start of a particular function in executable file 122 and executed whenever the function executes. In such a case, profiler 132 may store information regarding the execution of the function in profiling data 134 (e.g., when the function was called, how long the function took to execute, etc.). The instrumentation instruction may be a call to a function of profiler 132 and profiler 132 may record whenever the function is called. Alternatively, the instrumentation instruction may be an in-line instruction that captures profiling data 134 directly. In various implementations, profiler 132 may also be configured to utilize a statistical profiling technique to analyze some or all of an instrumented executable. For example, profiler 132 may be configured to periodically sample the program counter for the program to determine which portion of the program is being executed during the sampling period. Profiler 132 may perform statistical analysis using the sampling data to determine how often the different portions of the program code are executed.

Profiler 132 may utilize a multimodal approach to generating profiling data 134 for the program of executable file 122. For example, profiler 132 may utilize a statistical approach to analyze certain portions of the program and an instrumented approach to analyzing other portions of the program. In other implementations, profiler 132 may be configured to use any other type of profiling technique on at least a portion of the program (e.g., event-based profiling, flat-profiling, etc.). According to various implementations, the type of profiling technique used by profiler 132 may be controlled at runtime by specifying a controlling value for an instrumented portion of the program. For example, a control function may direct the program execution based on one or more variables set for the program. The selected control flow may direct the program execution to differently instrumented versions of the portion of the code, based on the value of a controlling variable. For example, a user may specify at runtime that a non-instrumented version of a function is to be used while the program is profiled. In such a case, profiler 132 may not collect profiling data regarding the function or may only collect profiling data regarding the function using a statistical profiling technique. In another example, a user may specify that a highly-instrumented version of the function is to be used when the program is profiled. In such a case, profiler 132 may collect profiling data regarding the execution of the instrumentation instructions in the version of the function.

Profiler data 134 generated by profiler 132 may include any information regarding the execution of the instrumented program. For example, profiler data 134 may include data indicative of when a portion of the program was executed, the location in the program that called the executed portion, any portion of the program that was called by the executed portion, information regarding the location of the executed portion in object files 116, or similar data. Profiler data 134 may also include various statistics generated by profiler 132. For example, profiler data 134 may include data indicative of how often a portion of the program was executed, the average time the portion took to execute, the maximum and/or minimum time the portion took to execute, and similar statistical values. In some cases, profiler data 134 may be provided to a user interface device via output 108 for review by a user. For example, a programmer may review profiler data 134 to identify portions of the program that may be rewritten for better performance.

According to various implementations, memory 104 may include restructuring engine 136 configured to analyze profiler data 134 and decomposition data 128 to generate restructured executable file 138. Restructuring engine 136 may analyze decomposition data 128 to determine possible execution paths for the program of executable file 122. For example, restructuring engine 136 may analyze decomposition data 128 to determine the locations of the various portions of the program, which portions of the program reference other portions, and the locations of extraneous data, such as padding bytes. Such information may be used by restructuring engine 136 to restructure the program by reassigning the various portions of the program to different addresses, in some implementations.

Restructuring engine 136 may optimize the structure of the program in executable file 122 using profiling data 134. In some implementations, restructuring engine 136 may analyze profiling data 134 to identify portions of the program that are commonly executed and/or portions of the program that are executed when the program is started. Restructuring engine 136 may use this information with decomposition data 128 to determine an optimized restructuring of the program. For example, assume that executable file 122 includes code blocks A-C having corresponding addresses in that order. Also, assume that code block A includes a reference to block C (e.g., block C is called during startup of executable file 122 before block B). In such a case, restructuring engine 136 may generate restructured executable file 138 having the following memory order: A-C-B. To maintain the execution order of the program of executable file 122, restructuring engine 136 may use the decomposition data 128 to update the references to any restructured blocks. For example, restructuring engine 136 may also update any references to blocks B-C (e.g., updating the reference from A to C, etc.), when generating restructured executable file 138.

Figure 2:
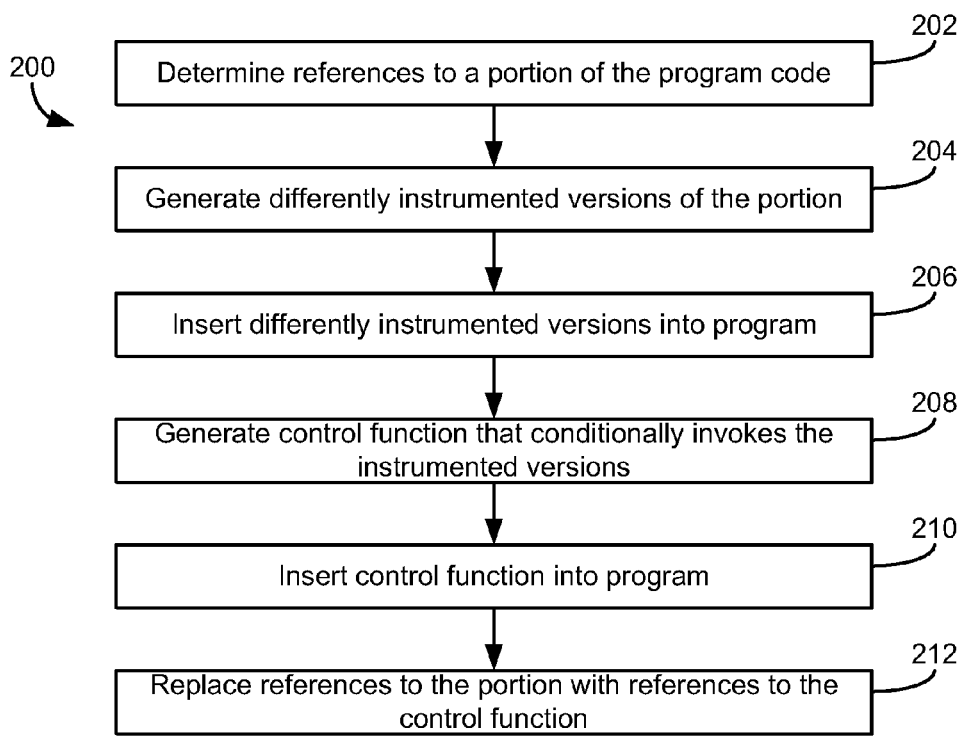
FIG. 2 is a flow diagram of an exemplary process for instrumenting an executable.

Referring now to FIG. 2, a flow diagram of an example process 200 for instrumenting an executable is shown. In various implementations, process 200 may be implemented by one or more processing circuits executing stored instructions. For example, process 200 may be performed by processing circuit 100 of FIG. 1 when instrumenter 130 is run. According to various implementations, process 200 may be used to convert an executable file into an instrumented executable, either as a new file or by replacing the original executable file.

Process 200 includes determining references to a portion of the program code within an executable file (202). The portion of the program code may be a function or may even be a code or data block, in some implementations. In various implementations, references to a portion of the program may be determined by analyzing relocation entries in the executable file, determining offset information by analyzing debug data associated with the executable file, recursively traversing portions of the program that call other portions of the program, and/or analyzing symbol and label data. In other implementations, references to a portion of the program may be determined by analyzing decomposition data. For example, a decomposer may decompose the executable file into code and data blocks. In some cases, the decomposition data may be a block graph of code and data blocks interconnected by edges representative of references to, or invocations of, non-contiguous portions of the code (e.g., a control flow arc, a virtual table, a pointer from one block to another, etc.). For example, a high-level statement such as:

static const char*foo="ABCDEF"

will result in two blocks, one representing the string, "ABCDEF" and another representing the variable foo. The variable block may include a reference to the block containing the string value, which may be represented as an edge in a block graph. Such a graph may be traversed to identify references to a portion of the program code to be instrumented.

Process 200 includes generating differently instrumented versions of the portion of the program (204). Any number of different versions may be generated, in various implementations (e.g., two versions, three versions, etc.). In some implementations, the object code for the portion of the program may be modified to generate the different versions (e.g., by inserting instrumentation instructions into some or all copies of the portion of the program). The degree of instrumentation for the generated versions may also vary from no instrumentation at all to instrumentation for each instruction of the portion of the program. For example, a first version of the portion may contain no instrumentation instructions and a second version may include an instrumentation instruction at the beginning of the portion (e.g., to generate profiling data indicative of when the portion of the program begins executing).

Process 200 includes inserting the differently instrumented versions into the program (204). In some implementations, the versions may be appended or inserted into an existing code segment of the executable program. For example, the generated versions may be appended to the same code segment that contains the original portion of the program. In other implementations, one or more new code segments may be generated for the executable program, to include the different versions. For example, a new range of program addresses may be allocated for the different versions of the portion of the program and the versions may be included in these addresses.

Process 200 includes generating a control function that conditionally invokes the differently instrumented versions (208). In various implementations, the control function may reference a global variable (e.g., a variable that controls the degree of instrumentation for the entire program) and/or a variable specific to the control function (e.g., a variable that controls only the degree of instrumentation for the portion of the program). For example, the control function may include one or more conditional statements that reference the different versions of the portion of the program.

In various implementations, a calltrace profiler DLL or other shared object file may be used to profile the instrumented executable (e.g., instrumentation instructions injected into the executable may invoke additional instrumentation code stored in a DLL). In such a case, a new import table entry for the DLL may be inserted into the program code. In some implementations, a conditional branch of the control function may appear as follows:

push foo_v2;
    jmp [imp_indirect_penter]

where foo_v2 is a generated version of the function "foo," and imp_indirect_penter is a profile hook exported from the calltrace profile DLL. For example, imp_indirect_penter may be a reference to a function of the calltrace profiler DLL. Such a function may identify a function associated with a return address and initialize a count for the identified function. Thus, the calltrace profiler may receive data regarding when the function "foo" would be called during execution of the program.

In some implementations, the control function may appear similar to:

foo_v2:
      call [imp_indirect_penter]
      {original instructions in foo} where {original instructions in foo} contains the original instructions of "foo" and call is an instruction to call [imp_indirect_penter] as a subroutine and return to the original instructions of "foo." In contrast to implementations that use the jmp instruction, the call instruction saves the return address, allowing the original instruction in foo to be executed after [imp_indirect_penter] (i.e., the return address does not need to be explicitly defined in the function of the calltrace profiler).

In some implementations, instrumentation instructions may be inserted at the basic block level. For example, assume that a particular function spans several code blocks. The beginning of a basic block within the function may be modified as follows:

start of basic block:
    push Block_ID
    call [imp_block_invoked]
    {original instructions in the block} where Block_ID is an identifier for the block and {original instructions in the block} contains the original instructions in the block. In other words, the same techniques used to instrument the program at the function level may be extended down to the basic block level of the program, allowing an even greater amount of profiling data to be generated.

Process 200 includes inserting the control function into the program (210). In some implementations, the generated control function may be inserted into the executable program by replacing the original portion of the program with the control function. In other implementations, a new segment may be added to the executable program and the control function may be inserted into the new segment.

Figure 3A:
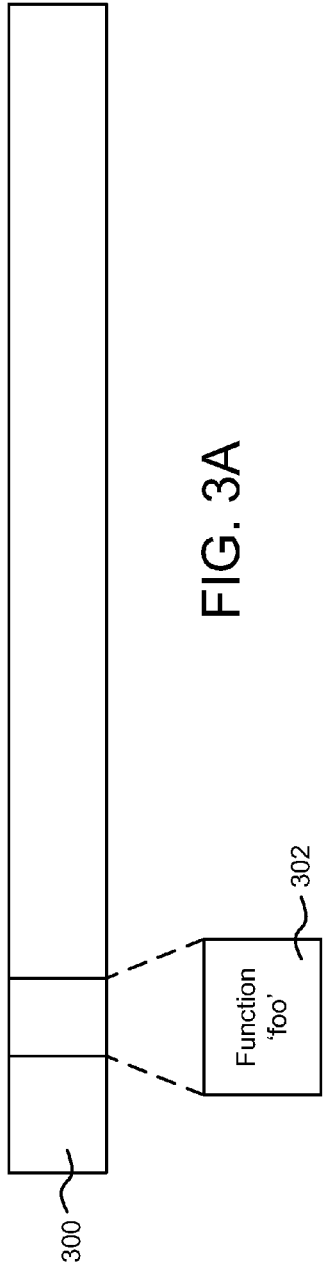
FIGS. 3A-3B are illustrations of an executable file being instrumented, according to various examples.
Figure 3B:
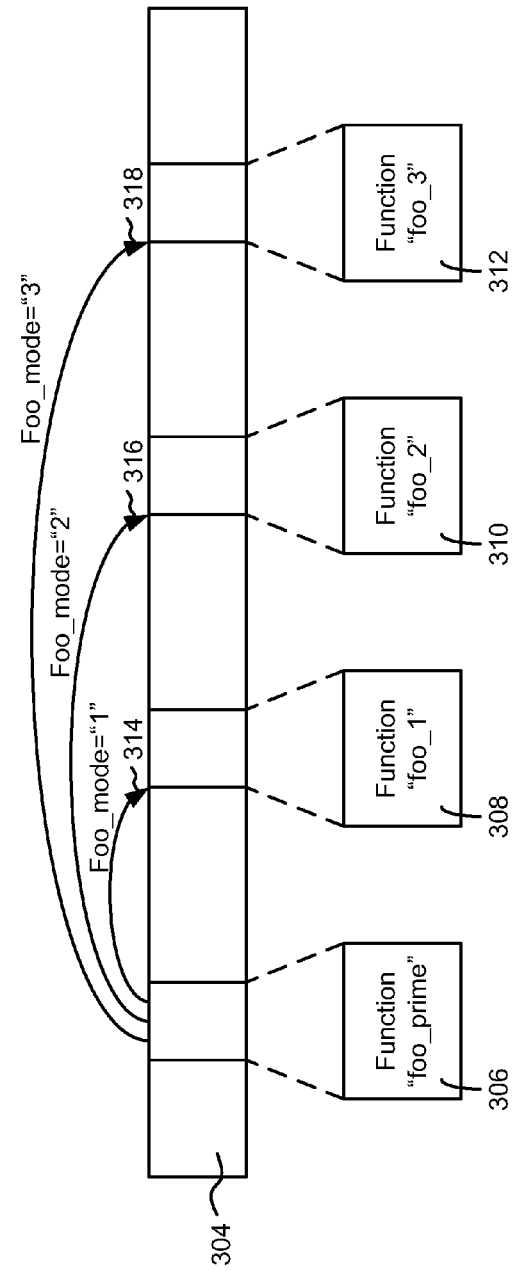

Referring now to FIGS. 3A-3B, illustrations of an executable file being instrumented are shown, according to various examples. In FIG. 3A, an executable program 300 may be analyzed to determine references to a function within executable program 300. As shown, executable program 300 may include a portion 302, i.e., a function "foo." Function 302 may be located within executable program 300 by analyzing debug data generated when executable program 300 was linked (e.g., a PDB file, a DWARF file, etc.), by analyzing relocation data within executable program 300, by recursively exploring function calls within executable program 300, and/or by analyzing decomposition data for executable program 300. A similar analysis may be used to determine all references to portion 302 (e.g., by identifying any portions of executable program 300 that reference the function "foo").

After identifying portion 302 and any references to it within executable program 300, differently instrumented versions of portion 302 may be generated. As shown in the example of FIG. 3B, three versions of portion 302 may be generated based on portion 302: a portion 308 (e.g., "foo_1"), a portion 310 (e.g., "foo_2"), and a portion 312 (e.g., "foo_3"). Portions 308-312 may include the code of portion 302, i.e., portions 308-312 include the same data and/or instructions as the function "foo." Portions 308-312 may also include different amounts of instrumentation instructions. For example, portion 308 may be simply a copy of portion 302 (e.g., portion 308 may not include any instrumentation instructions). In another example, portion 310 may include an instrumentation instruction associated with the start of portion 310. In a further example, portion 312 may include instrumentation instructions associated with the start, middle, and end of portion 312. Thus, portions 308-312 may perform the same instructions as function "foo," but allow for different degrees of profiling data to be generated regarding the execution of the function.

A control portion 306 (e.g., a control function "foo_prime") may also be generated to conditionally call portions 308-312 via invocations 314-316. For example, invocation 314 may invoke portion 308, invocation 316 may invoke portion 310, and invocation 318 may invoke portion 312. Control portion 306 may direct the flow of execution based on the value of one or more variables (e.g., a global variable, a variable specific to portion 306, etc.). For example, control portion 306 may direct the flow of execution based on the value of the variable Foo_mode. As shown, control portion 306 may invoke portion 308, if Foo_mode=1, portion 310 if Foo_mode=2, and portion 312, if Foo_mode=3.

Portions 306-312 may be inserted into executable program 300 to generate an instrumented executable program 304. In some implementations, some or all of portions 306-312 may be inserted into executable program 300 by appending a new program segment containing the functions. According to various implementations, any reference to portion 302 in executable program 300 may be replaced with references to portion 306 in instrumented executable program 304. Thus, any portion of executable program 300 that references portion 302 would reference portion 306 in instrumented executable program 304.

The one or more control variables used by control portion 306 may be set to control what profiling data is generated during profiling of instrumented executable program 304. For example, no instrumentation-based profiling data may be generated regarding portion 302, if portion 308 is selected for execution. In some cases, statistical profiling may be used instead of any instrumentation-based techniques to profile portion 302, when portion 308 is selected. In another example, portion 310 may be selected for execution, thereby executing an instrumentation instruction when portion 310 is executed.

Figure 4:
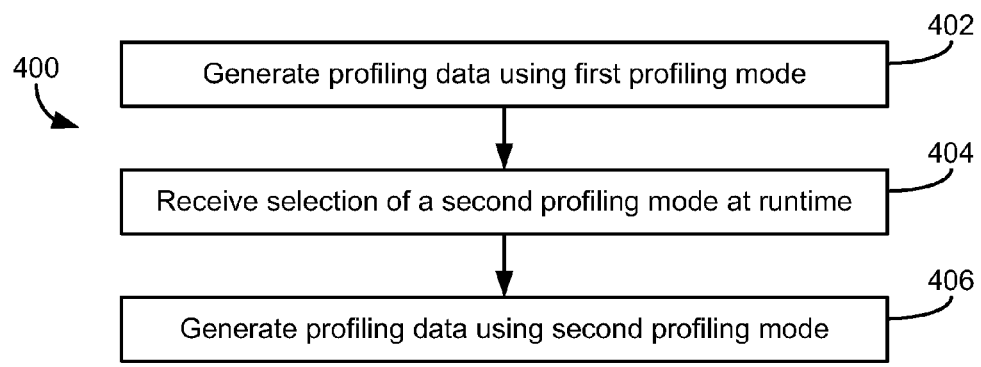
FIG. 4 is a flow diagram of a process for generating profiling data from an instrumented executable.

Referring now to FIG. 4, an example flow diagram of a process 400 for generating profiling data from an instrumented executable is shown. Process 400 may be implemented by one or more processing circuits executing stored instructions. For example, process 400 may be performed by processing circuit 100 of FIG. 1, when profiler 132 profiles an instrumented executable. According to various implementations, the instrumented executable may include a plurality of versions of a portion of the program, the versions including varying amounts of instrumentation instructions. References to the portion may be replaced in the instrumented executable to refer to a control portions that conditionally selects one of the plurality of versions of the portion of the program being instrumented.

Process 400 includes generating profiling data using a first profiling mode (402). The first profiling mode may use any type of profiling technique. For example, the first profile mode may be a statistics-based profiling mode, an event-based profiling mode, or an instrumentation-based profiling mode, according to various implementations. The first profiling mode may be a default mode or may be selected by specifying a parameter at runtime. For example, a user initiating the profiling may specify the profiling mode to be used while the executable is profiled by setting a parameter. The specified parameter may be used by a control function in the instrumented executable to select a version of a portion of the code to be executed. In one example, assume a non-instrumented version of a function is used during profiling, by default. In such a case, the profiler may use a less intrusive profiling technique, such as a statistics-based technique, to generate profiling data regarding the function.

Process 400 includes receiving a selection of a second profiling mode at runtime (404). In some implementations, a user overseeing the profiling of the executable may manually specify a second profiling mode at runtime (i.e., by operating an interface device). For example, the user may specify a parameter that communicated into the running executable (e.g., via a shared memory, a remote procedure call, an interprocess communication, etc.). Alternatively, the profiler may write the parameter value directly into the running executable, for example, using the WriteProcessMemory function in a Windows system and/or the debugging interfaces of the operating system. The second profiling mode may be of a different type as the first mode. For example, the second profiling mode may use instrumentation instructions to profile the executable, while the first profiling mode may use a statistical approach to profile the executable. In some cases, the second profiling mode may be of the same type as the first mode, but may generate more or less profiling data than the first mode. For example, both the first and second modes may generate profiling data using instrumentation. However, the second mode may use more instrumentation instructions, allowing greater detail to be captured during profiling.

In other implementations, the selection of the second profiling mode may be determined automatically (i.e., without further input from a user). For example, the profiler may be configured to expose APIs, allowing the profiled program to select the profiling mode programmatically. For example, a low-overhead profiling mode may be selected automatically during startup of the instrumented executable, if the startup phase has already been profiled (e.g., in situations in which the startup would yield substantially similar results each run). In some cases, the automatic selection may be based in part on profiling data generated via the first profiling mode. For example, profiling data generated using a statistical approach may indicate that a particular portion of code in the executable has a higher than average execution time. To generate more details about the execution of the portion, the profiler may automatically select to change the profiling mode from the first, statistics-based mode to a second, instrumentation-based mode. In another example, the profiler may change from minimally intrusive instrumentation-based mode to another instrumentation-based mode that uses a great amount of instrumentation instructions to generate profiling data.

Process 400 also includes generating profiling data using the second profiling mode (406). According to various implementations, the received selection of the second profiling mode may be used by a control portion in the instrumented executable to select a different version of a portion of the program than the version used in the first profiling mode. For example, assume that the first profiling mode uses a statistical approach to generate profiling data for a non-instrumented version of a function. Also, assume that the second profiling mode uses an instrumentation-based approach to generate profiling data for an instrumented version of the function. In various implementations, the received selection may correspond to a global variable of the instrumented executable or to a variable specific to the control portion. For example, a user may specify that the entire executable is to be profiled using a statistical approach or an instrumentation-based approach. In another example, the user may specify that the portion of the program associated with the control portion is to be profiled using an instrumentation-based approach. Thus, different portions the executable may be profiled using different profiling modes without having to re-instrument the executable, in some implementations.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more tangible and non-transitory computer storage media for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an opesocial networking system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a USB flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending websites to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a GUI or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computerized method for profiling an executable program comprising:
    determining, by a processing circuit, one or more references to a portion of code in the executable program;
    generating, by the processing circuit, a plurality of versions of the portion of code, each generated version having a different number of instrumentation instructions inserted into the portion of the code;
    inserting, by the processing circuit, the generated versions of the portion of code into the executable program;
    generating, by the processing circuit, a control function that conditionally executes the generated versions of the portion of the code;
    inserting, by the processing circuit, the control function into the executable program; and
    replacing, by the processing circuit, the one or more references to the portion of code with one or more references to the control function.

2. The method of claim 1, wherein a first version of the portion of code comprises no instrumentation instructions and a second version comprises one or more instrumentation instructions.

3. The method of claim 1, wherein the control function executes one of the generated versions based in part on a global variable.

4. The method of claim 1, wherein the control function executes one of the generated versions based in part on a variable specific to the control function.

5. The method of claim 2, wherein an instrumentation instruction in the second version of the portion of code generates profiling data indicative of when the portion of code in the second version begins executing.

6. The method of claim 1, wherein the one or more references to the portion of code in the executable program are determined in part by analyzing at least one of: relocation data in the executable program, an object file used to link the executable program, or debug data generated when the executable program is linked.

7. The method of claim 1, wherein the one or more references to the portion of code in the executable program are determined in part by analyzing decomposition data for the executable program, the decomposition data comprising a block graph representing a flow of execution between different portions of code in the executable program.

8. The method of claim 2, further comprising:
    generating, by the processing circuit, profiling data using a statistical profiling mode by executing the first version of the portion of code;
    receiving, via a user interface device, a selection of a instrumentation-based profiling mode, the selection being configured to cause the control function to execute the second version of the portion of code; and
    generating, by the processing circuit, profiling data using an instrumentation-based profiling mode by executing the second version of the portion of code.

9. The method of claim 2, further comprising:
    generating, by the processing circuit, first profiling data using a statistical profiling mode by executing the first version of the portion of code;
    selecting, by the processing circuit, an instrumentation-based profiling mode based in part on analysis of the first profiling data; and
    generating, by the processing circuit, second profiling data using an instrumentation-based profiling mode by executing the second version of the portion of code.

10. A computerized system for profiling an executable program comprising a processing circuit operable to:
    determine one or more references to a portion of code in the executable program;
    generate a plurality of versions of the portion of code, each generated version having a different number of instrumentation instructions inserted into the portion of the code;

insert the generated versions of the portion of code into the executable program;
generate a control function that conditionally executes the generated versions of the portion of the code;
insert the control function into the executable program; and
replace the one or more references to the portion of code with one or more references to the control function.

11. The system of claim 10, wherein a first version of the portion of code comprises no instrumentation instructions and a second version comprises one or more instrumentation instructions.

12. The system of claim 10, wherein the control function executes one of the generated versions based in part on a global variable.

13. The system of claim 10, wherein the control function executes one of the generated versions based in part on a variable specific to the control function.

14. The system of claim 11, wherein an instrumentation instruction in the second version of the portion of code generates profiling data indicative of when the portion of code in the second version begins executing.

15. The system of claim 10, wherein the one or more references to the portion of code in the executable program are determined in part by analyzing at least one of: relocation data in the executable program, an object file used to link the executable program, or debug data generated when the executable program is linked.

16. The system of claim 10, wherein the one or more references to the portion of code in the executable program are determined in part by analyzing decomposition data for the executable program, the decomposition data comprising a block graph representing a flow of execution between different portions of code in the executable program.

17. The system of claim 11, wherein the processing circuit is further operable to:
generate profiling data using a statistical profiling mode by executing the first version of the portion of code;
receive a selection of a instrumentation-based profiling mode, the selection being configured to cause the control function to execute the second version of the portion of code; and
generate profiling data using an instrumentation-based profiling mode by executing the second version of the portion of code.

18. The system of claim 11, wherein the processing circuit is further operable to:
generate first profiling data using a statistical profiling mode by executing the first version of the portion of code;
select an instrumentation-based profiling mode based in part on analysis of the first profiling data; and
generate second profiling data using an instrumentation-based profiling mode by executing the second version of the portion of code.

19. A computer-readable, storage medium having instructions therein, the instructions being executable by a processor to cause the processor to perform operations comprising:
determining one or more references to a portion of code in the executable program;
generating a plurality of versions of the portion of code, each generated version having a different number of instrumentation instructions inserted into the portion of the code;
inserting the generated versions of the portion of code into the executable program;
generating a control function that conditionally executes the generated versions of the portion of the code;
inserting the control function into the executable program; and
replacing the one or more references to the portion of code with one or more references to the control function.

20. The medium of claim 19, wherein a first version of the portion of code comprises no instrumentation instructions and a second version comprises one or more instrumentation instructions, the operations further comprising:
generating profiling data using a statistical profiling mode by executing the first version of the portion of code;
receiving a selection of a instrumentation-based profiling mode, the selection being configured to cause the control function to execute the second version of the portion of code; and
generating profiling data using an instrumentation-based profiling mode by executing the second version of the portion of code.

\* \* \* \* \*